Patented Sept. 29, 1942

2,296,857

UNITED STATES PATENT OFFICE 2,296,857

MAKING ARTIFICIAL STRUCTURES FROM XANTHATES

Leon Lilienfeld, deceased, late of Vienna, Germany, by Antonie Lilienfeld, special administratrix, Gstaad, Switzerland; Antonie Lilienfeld, administratrix of said Leon Lilienfeld, deceased, assignor to Lilienfeld Patents Inc., Boston, Mass., a corporation of Massachusetts No Drawing. Application November 12, 1940, Serial No. 365,393. In Great Britain July 24, 1935

17 Claims. (Cl. 18—54)

In the British Patent 323,747 of this inventor, Dr. Leon Lilienfeld, and corresponding U. S. Patent 2,109,591, is described a process of manufacturing regenerated films by coagulating viscose in a strongly alkaline solution, e. g. caustic alkali solution or alkali sulphide solution, warm and preferably hot. Such a process is too slow for any commercial operation, and is only of theoretical importance, and operates only as a laboratory method.

The present process is based on the discovery, by this inventor, that it is entirely feasible and practical to coagulate, by the use of coagulating baths containing alkali metal carbonates (normal carbonate or bicarbonate) as the essential coagulating agents, solutions of xanthates or cellulose and xanthates of such water-insoluble oxy-organo derivatives of cellulose (ethers and organic acid esters) as are capable of being dissolved in dilute caustic alkali solution (at room temperatures or under refrigeration) as well as alkali-soluble xanthates of such water-insoluble ethers and organic acid esters of cellulose as contain less of the introduced organic radical than is necessary to give alkali-soluble ethers and esters of cellulose.

It is to be understood that these last mentioned ethers and esters of cellulose (in their unxanthated condition), like cellulose, are insoluble in water, at all temperatures, i. e. they do not dissolve in water or at above room temperatures, nor at freezing temperatures, nor at intermediate temperatures.

The said subject matter can be classified into four groups, according to the xanthates used, as follows:

I. Viscoses in the making of which less than 20% of CS$_2$ (based on the original cellulose), has been used. This part of the present invention is continued from the copending application 90,821.

II. Viscoses in the making of which 20% or more of CS$_2$ (based on the original cellulose) has been used. This part of the present invention is continued from the copending case 90,818.

III. Alkaline solutions of xanthates of oxy-organo derivatives of cellulose, made with below 20% CS$_2$ (based on the amount of the oxy-organo derivative of cellulose used). This part of the present invention is continued from copending application Ser. No. 90,820.

IV. Alkaline solutions of xanthates of oxy-organo derivatives of cellulose, i. e., xanthates of cellulose ethers or esters made with 20% or more of CS$_2$ (based on the amount of said cellulose derivative used). This part of the present invention is continued from copending application Ser. No. 90,819.

The present case is accordingly, in part a continuation of each of the four U. S. applications mentioned in the four paragraphs above.

These four copending cases were filed in the U. S. on July 15, 1936, all claiming the Convention priority of British applications 21,052 and 21,347, filed respectively July 24, and 27, 1935 (see British Patent No. 472,888 and its divisions No. 472,933, No. 472,934 and No. 472,935). It is to be understood that solutions of mixtures of such xanthates and also solutions of one or more of such xanthates containing other alkali-soluble water-insoluble cellulose ethers, can be employed herein.

In the present case, the coagulating baths contain, as the characteristic and essential coagulating component, an alkali metal carbonate, e. g., a monocarbonate or a bicarbonate, or a mixture of these, and this latter term is intended to embrace also carbonate compounds of intermediate composition between monocarbonate and bicarbonate.

While the carbonates of all the alkali metals are usable in this invention, reference will be made hereinafter to sodium carbonate, this being the cheapest and most readily available one, and hence the most practical from the commercial standpoint.

These coagulating baths can, if desired, contain also other alkaline salts and/or other neutral salts, but do not need to contain (and preferably do not contain) any salts capable of neutralizing the caustic alkali present as the solvent in the xanthate solutions being treated. Thus ammonium sulphate, ammonium chloride, etc. are not used in the coagulating baths. As a result, the caustic alkali present in the xanthate solutions and the alkali carbonate initially present in the coagulating bath, will remain in the coagulating bath, and can be reused again and again in the process. It is important to note that the coagulation is sufficiently rapid and complete for commercial operations, such as the manufacture of artificial thread, artificial silk, films, coatings, sizings, dressings on fabrics, threads, paper, etc. which will hereinafter be termed "artificial structures." And the regenerated structures (of cellulose, cellulose ethers, cellulose esters, etc.) are of excellent dynamometric properties. This applies to tensile strength, particularly the wet strength, and/or extensibility.

Since in the usually heretofore used processes, the coagulating baths commonly used are dilute acids, acid salts, ammonium salts of strong acids (e. g. of strong mineral acids), etc., or mixtures of one or more of such bodies with neutral alkali metal salts, alkaline earth salts, and salts of zinc, etc., the recovery of the caustic alkali content of the xanthate solutions is practically impossible. In the present process however, the excess of the coagulating bath can be reworked to regenerate caustic alkali or alkali carbonate or both.

In the present process, (as is customary in the art) the coagulating solution is preferably fed continuously to the coagulating bath, while an equal amount of the said solution is withdrawn at some remote point of the said bath. In the present process, this withdrawn solution will usually contain a slight amount of caustic alkali in solution, and the latter can be converted into carbonate or bicarbonate by treatment with $CO_2$ or gases containing $CO_2$ such as stack gases, lime kiln gases etc. This solution can be then adjusted as to concentration, e. g. by adding water if too concentrated, and again added to the supply vessel from which the coagulating bath is being fed.

Eventually, excess of coagulating solution to be withdrawn from the process, can be concentrated to crystallize out soda crystals, or can be concentrated if necessary and carbonated to precipitate and recover sodium bicarbonate, or can be causticized with lime to give caustic soda solution which can be used (at proper concentration) to dissolve the xanthate, or in preparing the xanthates, or in preparing the soda cellulose to be etherified or xanthated, or for other purposes in the process, or in the plant.

A particular mode of treatment of the mixed sodium-carbonate-caustic-soda solution is to evaporate this to dryness and heat the mass sufficiently to melt the caustic soda which thereby can be separated from the non-fused sodium carbonate.

Since the caustic soda and the acid coagulating agents, heretofore usually used, neutralize each other and are both lost, and since the amount of caustic alkali used is large, this alkali recovery, which is possible in the present invention is a feature of considerable importance from the standpoint of total cost.

The alkali-soluble xanthates of cellulosic bodies to be used can be made in any preferred manner. Many different methods of making viscose are known in the prior art. Methods of making suitable cellulose derivatives and xanthates thereof, including particularly alkali-soluble xanthates of alkali-soluble water-insoluble ethers or derivatives of cellulose, and alkali-soluble xanthates of water-insoluble ethers of cellulose, as well as xanthates of cellulose ethers which ethers contain less of the substituent alcohol radical than would be needed to produce alkali-soluble cellulose ethers, and/or the cellulose ethers themselves, which are suitable for being xanthated to produce alkali-soluble xanthates suitable for use as the xanthates in the process of the present invention, are disclosed in U. S. patents of this inventor, Numbers 1,589,606, 1,589,607, 1,682,292, 1,682,293, 1,682,294, 1,722,927, 1,722,928, 1,858,097, 1,910,440, 1,938,032, 1,938,033, 2,021,861, 2,095,524, 2,100,010, 2,163,607 and 2,169,207, and in British patents of this inventor, Numbers 357,167, 357,527, 357,595, 367,920, 374,527, 459,122, 459,123, 459,124, 462,283, 462,456, 462,712 and 462,713.

These are cited merely as examples of patents showing suitable ethers. Many other such ethers can be employed, so long as they are insoluble in water and not too far decomposed or degraded. The ethers can, for example, be treated with alkali solution (e. g. NaOH solution) and (optionally after pressing to remove any excess of the alkali solution) treated with carbon disulphide. The xanthates thereby produced can then be dissolved in dilute caustic alkali solution, or in solutions containing caustic alkali in which other alkali-soluble cellulose ethers have been dissolved or suspended. With the above xanthates can also be present in the intermediate, other cellulose derivatives, e. g. such as shown in the U. S. patents of this inventor. Numbers 1,642,587, 1,642,588, 1,674,401, 1,674,402, 1,674,403, 1,674,404, 1,674,405, 1,680,224, 1,682,212, 1,682,293, 1,682,294, 1,722,927, 1,722,928, 1,771,460, 1,771,461, 1,771,462, 1,804,354, 1,881,741, 1,890,393, 1,906,910, 1,938,032, 1,938,033, 1,991,810, 2,021,862, 2,021,863, 2,021,864, 2,051,051, 2,087,981, and 2,176,799.

The solutions of the cellulose xanthates or cellulose ether xanthates can also be treated with small amounts of any of the etherifying reagents disclosed in the Lilienfeld patents mentioned above.

Where "a" xanthate, "a" cellulose derivative, etc. are referred to above, it is to be understood that one or several of such materials can be employed.

As to the amount of carbon bisulphide in modifications I and III, less than 20% can be used, and preferably less than 15% and still more preferably even less than 10%, and most advantageously down to about 5–6% (as in Example 3, below) based respectively upon the weight of the air-dry cellulose used, or based on the dry weight of the cellulose ether (or ester) used. The advantages of such small amounts of $CS_2$ include greater dry and wet tenacity of the artificial threads or other structures produced, and generally improved properties in such products, as well as a marked saving in the cost of the process, due to the fact that carbon bisulphide is (compared with the other materials used in the viscose process) relatively expensive. Low $CS_2$ content also means greater stability of the xanthate solutions.

Even when large amounts of carbon bisulphide are used in making the xanthates, the desulphurization step is much less expensive than in the previously used xanthate processes, using the same amount of $CS_2$ because alkali carbonate solutions dissolve sulphur and many sulphur compounds. With low $CS_2$ content, the desulphurization is much simplified and even can be omitted in many cases.

When the xanthate has been made with more than 20% of $CS_2$ the present invention is especially applicable if the xanthate solution has acquired a degree of maturity substantially exceeding the stage $C_{24}$ and preferably exceeding the stage $C_{36}$.

It is altogether surprising that alkali carbonate solutions (which are always alkaline in reaction), are able to coagulate shaped xanthate solutions of the aforementioned types with the rapidity and completeness called for in the art of coagulating shaped structures, and that the shaped structures produced according to the invention have valuable properties. They are even superior, in some respects, to structures made by coagulating the same xanthates with the conventional acid coagulating baths heretofore commonly used in the viscose industry.

This discovery is the more surprising, since it could not have been assumed that a solution of a cellulose xanthate or cellulose ether xanthate or cellulose ester xanthate, in caustic alkali solution would be capable of being coagulated by means of solutions of alkali carbonates, i. e. solutions of salts having alkaline reaction. Least of all, however, would it have been expected that the coagulation would occur with a rapidity and completeness sufficient for the commercial production of shaped structures. It was equally unpredictable that solutions of salts having an alkaline reaction would be able to precipitate shaped xanthate solutions in the form of coherent structures which would have a sufficient degree of strength and solidity to stand all operations involved in the production and/or after-treatment of shaped structures.

This inventor has further observed that, so far as such cellulose xanthates and cellulose ether xanthates as are prepared by means of a proportion of carbon bisulphide which is not smaller than, or exceeds 20 per cent of carbon bisulphide calculated on the weight of the parent cellulose or cellulose ether, such xanthates are suitable particularly for the present invention as have attained a degree of maturity substantially exceeding the stage $C_{24}$, preferably exceeding the stage $C_{36}$.

In other words: The present invention comprises giving such xanthate solution the form of a shaped structure and coagulating the shaped xanthate solution by means of a solution of one or more alkali carbonates and particularly the normal alkali carbonates.

I have been able to prove that, when proper working conditions are observed, in spite of their alkalinity, the secondary alkali carbonates coagulate shaped cellulose ether xanthate solutions of the aforementioned type with the rapidity and completeness called for in the art of shaped structures, and that the shaped structures produced according to the invention have valuable properties.

Usually, a considerable accumulation, i. e. presence of a large proportion of caustic alkali or presence of any caustic alkali in the coagulating bath is undesirable, and this will be avoided, for example, by either continuously or from time to time introducing into the coagulating bath carbon dioxide e. g. in the form of lime kiln gases, cleaned stack gases, etc., and thus, according to the introduced quantity of $CO_2$, converting the caustic alkali present in the bath or a major part of it, into alkali carbonate. Thus, in some cases, the unfavorable influence the caustic alkali (getting into the bath from the freshly coagulated shaped structure or on the coagulating power of the secondary alkali carbonate solution or on the strength and thus on the conductibility of the freshly coagulated material through the spinning or film casting or coating machine (or part of it) can be checked.

The carrying out of the present invention is simple. It consists essentially of bringing the shaped solution of one or the other of the xanthate solutions mentioned above under I, II, III or IV, if desired or necessary after suitable aging, into contact with a coagulating agent consisting of an alkali carbonate solution.

Thereupon optionally after having been treated with a solution of an acid or of a neutral or acid salt or of an acid and a neutral or acid salt or after having been further treated with a solution of an alkaline salt, for example an alkali carbonate or an alkaline alkali borate or an alkaline alkali silicate or phosphate or acetate or sulphite or the like, the coagulated shaped structure is washed and, optionally after being treated with an acid medium or any other medium set forth above and re-washed, and dried.

As far as supportless shaped structures, such as artificial threads, artificial hair, artificial straw, film, bands, strips or the like are concerned, the ether xanthate solution may be shaped and coagulated by extruding it through suitably formed openings into a bath containing at least one secondary alkali carbonate. Supportless shaped structures, such as films or strips or the like may be produced according to the invention also by spreading the xanthate solution on a smooth surface which is then immersed in the coagulating bath and thereafter removing the coagulated shaped structure from the said surface and finishing the shaped structure as indicated in the foregoing paragraph. In case of such shaped structures as are combined with a rigid or pliable support, such as coatings, layers and impregnations of any kind, dressing of fabrics, textile printing, book cloth, tracing cloth, sizing of yarn, paper sizing, paper-like surfacing, etc., the shaping and coagulating may be accomplished by wholly or partially coating, impregnating, printing or otherwise covering or incorporating the xanthate solution with a rigid or pliable support, or otherwise applying a liquid or paste to the support, and, with or without intermediate drying, treating the material with the medium containing at least one alkali carbonate (particularly a normal carbonate), by either introducing the material into a bath containing such carbonate or by spraying a medium containing such carbonate on the material or by conducting the material through a mist containing such carbonate or by any other method.

It is to be understood that instead of using a single one of the xanthate solutions mentioned above in paragraphs I, II, III and IV, a mixture of two or more of such xanthates can be used, or one or more of such xanthates together with one or more water-insoluble alkali-soluble cellulose ethers, (all dissolved in dilute caustic alkali solution) can be employed. Mixtures of such xanthate solutions with the reaction products produced by treating cellulose xanthate solutions or cellulose ether xanthate solution with etherifying reagents (see Lilienfeld U. S. Patents 2,021,862–3–4 and 2,051,051) can be similarly employed, (see also U. S. Patents 2,087,981 and 2,176,799).

One object of the invention is to provide a method of making artificial structures from such xanthate solutions as are mentioned above, which will permit recovery of a large part of the caustic alkali present in the solvent for the xanthate, and permit recovery of a large part of the alkali carbonate in the setting bath (for reuse). Other objects will be apparent.

ADVANTAGES OF LOW CARBON BISULPHIDE AMOUNT

For obvious economical reasons eager efforts have been made to produce shaped structures or other useful articles from xanthate solutions and particularly viscose prepared with small proportions of carbon bisulphide (see U. S. Patent 1,658,607).

Such attempts have however failed because the shaped structures produced from such viscose by means of the conventional coagulating baths of the viscose art, are deficient in extensibility.

It is possible however, according to the present invention, to produce from cellulose xanthates or cellulose ether xanthates, or other xanthate of cellulosic bodies prepared by the use of low percentages of carbon bisulphide, shaped structures which have extensibilities sufficient for all practical purposes.

This achievement is important not only because it affords a huge economy in the art of making shaped structures from viscoses, but also because, for the first time, it makes this economy possible without impairing the dynamometric or other properties of the shaped structures.

In the present invention, the dynamometric properties, i. e. tensile strength, particularly in the wet state and/or extensibility of the shaped structures, produced according to the present invention from solutions of cellulose xanthates and cellulose ether xanthates of low $CS_2$ content, are superior to the dynamometric properties of the same type of shaped structures prepared from the same cellulose xanthate solutions or cellulose ether xanthate solution, when using the conventional coagulating agents.

The use of low percentages of carbon bisulphide also has the advantage that, since proportions of sodium sulphide, sodium sulphydrate and sodium trithiocarbonate contained in the xanthate solutions are considerably smaller than in xanthate solutions prepared by means of the usual proportions of carbon bisulphide, the coagulating baths become less contaminated and/or discolored than when treating xanthate solutions prepared by means of carbon bisulphide usual in the art.

But, what is more important:

Since, owing to the alkalinity of the baths, in the present process, no sulphur or only reduced quantities of sulphur are deposited in the shaped structures, (this being particularly the case in modifications I and III) and since alkali carbonates act as desulphurizing agents in many cases, the desulphurizing and/or bleaching of the shaped structures (which operations are necessary in the finishing of shaped structures produced from the customary cellulose xanthates or cellulose ether xanthates when using acid coagulating baths) may be dispensed with or applied only in a restricted manner. Hence the reuse of the coagulating agent (this bath being thereby kept purer) in the process of making the shaped structures becomes more practical.

A further object is to make the desulphurization and/or bleaching of the shaped structures unnecessary or at least considerably to simplify and cheapen these operations.

Consequently, the process permits a far reaching economy in the production of shaped structures from cellulose xanthates and cellulose ether xanthates.

In many cases it is advantageous to the filtering of the viscose or cellulose ether xanthate solution, and sometimes also to the coagulating capacity of these xanthate solutions and/or to the properties and appearance of the finished shaped structures produced, to use in the preparation of the xanthate solutions, particularly however during at least a part of the dissolving step, at least temporarily a temperature below room temperature, for example a temperature between plus 5 and minus 10° C. or lower.

Any suitable softening agent such as glycerine or a glycol or a sugar, such as glucose or a soap or Turkey-red oil, or a drying or non-drying oil, in short, any substance known in the viscose art as addition to viscose, may be added to any of the herein described xanthate solutions prior to its conversion into artificial structures according to the present invention.

Normal carbonates of all alkali metals may be used in the present invention, in aqueous solution, as coagulating agents.

They may be used also in the form of bicarbonates when the temperature of the coagulating bath is such as to cause decomposition of at least part of the bicarbonates used.

The proportions of the alkali carbonates contained in the coagulating baths may be varied within wide limits, for example from 5 to 36% (preferably about 27 to 31%) of alkali carbonate calculated as $Na_2CO_3$ or from 3 to 14% (preferably about 12%) of an alkali bicarbonate calculated as $NaHCO_3$.

The temperature of the coagulating baths may be varied within wide limits, for example from 5° C. up to the boiling point. Thus the coagulating bath may be used at room temperature or below room temperature, for example at 8 to 10° C. or above room temperature, for instance, at 30 to 45° C. or at 60° C. or at 90° C.

The practice of the invention (in all four modifications I, II, III, and IV), comprises bringing a solution or paste of a xanthate of a cellulosic body, as stated above, in a caustic alkali solution, into the form of a desired shaped artificial structure and acting upon the shaped solution or paste with a coagulating agent (preferably a bath) which is an aqueous solution containing at least one alkali carbonate of the concentration stated above.

As far as it is compatible with alkali carbonates any organic substance known in the viscose art as addition to coagulating baths, may, in the present invention be added to the coagulating media containing one or more alkali carbonates, for example glycerine or a sugar, (such as glucose) or Turkey-red oil or the like. But obviously organic substances which would destroy alkali carbonates, are not to be employed, in amounts capable of destroying any substantial part of said carbonate.

Also salts which are soluble in the baths can also be added, e. g. neutral or alkaline salts of the alkali metals, e. g. sodium chloride, nitrate, phosphate, borate, silicate, sulphate, etc. Ammonium salts of strong acids, e. g. sulphate, chloride, etc. are not added to these baths, since these would be incompatible with sodium carbonate, and would prevent recovery of the caustic alkali.

On leaving the coagulating bath containing one or more alkali carbonates, the freshly coagulated shaped structure may be directly washed with water and then dried or, with or without being washed with water, it may be treated with (for instance conducted through) a bath containing an acid, or a neutral or an acid salt or an alkaline salt, or an acid and a neutral and/or an acid salt or an ammonium salt of a strong acid, or any coagulating or precipitating bath known from the viscose art or from the art of making shaped structures from other alkali-soluble cellulose derivatives (Lilienfeld baths included) and then washed and dried.

The process may also be so conducted that, directly on leaving the carbonate coagulating bath, the freshly coagulated shaped structure is, for a few seconds up to several hours, treated with a cold or warm or hot solution of an alkali carbonate (for example a sodium carbonate solution of 10–30% strength), which solution may or may not contain one or more other neutral or alkaline salts (compatible with sodium carbonate) whereupon the shaped structure is washed or, optionally after being washed for a shorter or longer time, soured (i. e. treated with a cold or hot bath containing an acid or an acid salt or an acid and one or more neutral salts or acid salts) and further washed. This mode of procedure is to the purpose for example in cases in which, owing, for instance, to insufficient aging of the viscose, or to an inappropriate composition or temperature of the coagulating medium, the shaped structures freshly coagulated by a medium, containing one or more alkali carbonates are not directly washable for a considerable time, i. e. show the tendency of greatly swelling or even dissolving in water.

Not uninteresting artificial structures are obtained according to the present invention when, on leaving the coagulating bath containing alkali carbonate the freshly coagulated shaped structures are directly introduced into an acid bath (for instance, into dilute sulphuric acid (e. g. of 10% strength or any other acid bath commercially used in the viscose art) and then washed. This modification of the process results in shaped structures such as threads or film or coatings or layers or impregnations of any kind which, in some cases, contain hollow spaces (bubbles).

The desulphurization and bleaching of the artificial structures produced according to the invention (where needed) may be effected by any method or process known in the viscose art for the desulphurization and/or bleaching of artificial structures, such as threads, film or the like.

The shaped structures produced according to the invention may, in any suitable stage of their production, be treated with any softening or lubricating agent known in the viscose art.

It is of course well known that heretofore in making artificial structures, e. g. artificial threads, it has been necessary to wash very thoroughly. When washing spinning cakes of artificial silk, it frequently requires many hours, (often a day or more) to thoroughly wash out the soluble matter, where this operation is conducted (as is common) by dripping water upon the said spinning cakes hung in vertical rows. This is here mentioned to illustrate "infinite washability". Many artificial silks which could stand washing for five to ten minutes without swelling, would swell badly or even disintegrate if so washed for 15–30 hours.

In order to explain the nature of the present invention, the following specific examples are set forth. But it is to be understood that the invention is not limited to these examples, to the precise properties of ingredients, the times and temperatures and sequences of steps set forth. The parts are by weight:

EXAMPLE I (ILLUSTRATING MODIFICATION I)

1,000 parts of air-dry cotton linters or wood pulp are steeped in 10,000 to 20,000 parts of caustic soda solution of 18 per cent strength at 15 to 20° C. and the mixture allowed to stand at 15 to 20° C. for 1 to 24 hours. The resulting mass is then pressed to 3,000 to 3,500 parts and comminuted at 10 to 20° C. for 2 to 3 hours in a Werner-Pfleiderer shredder or any other suitable comminuting machine or in a Werner-Pfleiderer xanthating machine whose blades may be dentated. Then the thus obtained alkali cellulose is allowed to mature at 21° C. for 48 hours, whereupon it is treated in a xanthating machine with 100 parts of carbon bisulphide (i. e. 10% based on the cellulose used), the time of treatment being according to the intensity of stirring, kneading or agitation given the reaction mass, 1 to 12 hours.

The thus obtained cellulose xanthate is now dissolved in so much caustic soda and water as to yield a viscose containing 8 per cent of regenerable cellulose and 6 to 9 per cent of caustic soda. The dissolving may be conducted at room temperature or at a temperature between room temperature and 0° C. or at 0° C. or, according to the process described in British specification No. 212,865 or the corresponding U. S. Patent 1,658,607, at a temperature below 0° C. for example at minus 5 or minus 10° C. or lower.

After having remained at 15 to 18° C. for 24 to 35 hours and after having been during this time filtered and freed from gas bubbles, the viscose is worked up into shaped structures under the following working conditions.

*Artificial threads*

(1) The viscose is extruded through a spinning nozzle having 54 perforations of 0.08 to 1 mm. diameter at a speed of 4.8 to 5 ccm. per minute, into one of the following coagulating baths:

(a) sodium carbonate solution of 36 per cent strength at 90° C., or (b) sodium carbonate solution of 32 per cent strength at 60° C., or 70° C. or 80° C. or 90° C. or (c) sodium carbonate solution of 28% strength, at 45 to 50° C. or 60° C. or 70° C. or 80° C. or 90° C. or (d) sodium carbonate solution of 21 per cent strength at 45 to 50° C. or at 60° C. or 70 to 80° C., or at 90° C. or (e) sodium carbonate solution of 15 per cent strength at 45 to 50° C. or at 60° C. or 70 to 80° C. or at 90° C. or (f) sodium carbonate solution of 10 per cent strength at 45 to 50° C. or at 60° C. or 70 to 80° C. or at 90° C. or (g) a bath containing 20 per cent of sodium carbonate at 20 to 25° C. or (h) a bath containing 27 per cent of sodium carbonate at 25 to 30° C. or (i) a bath containing 34 per cent of sodium carbonate at 30 to 38° C.

(j) a bath containing 31 per cent of sodium carbonate at 40° C. or (k) a bath containing 23 to 24 per cent of sodium carbonate and 15 to 16 per cent of sodium sulphate at 50° C. or (l) a bath containing 28 per cent of sodium carbonate and 10 per cent of sodium sulphate at 50 to 60° C. or at 70 to 90° C. or (m) a bath containing 26 per cent of sodium carbonate and 10 per cent of glucose and glycerol at 50 to 60° C. or at 70 to 90° C. or (n) a bath containing 21 per cent of sodium carbonate and 13.5 per cent or 18 per cent of sodium sulphate at 50 to 60° C. or at 70 to 90° C. or (o) a bath containing 21 per cent of sodium carbonate, 13.5 parts of sodium sulphate and 10 per cent of glucose or glycerol at 50 to 60° C. or at 70 to 90° C. or (p) a bath containing 19 per cent of sodium carbonate, 12 to 13 per cent of sodium sulphate and 8 per cent of glucose at 50 or 60 or 70° C. or (q) a bath containing 28 per cent of sodium carbonate and 8 per cent of borax ($Na_2B_4O_7 \cdot 10 H_2O$) at 50 to 60° C. or at 70 to 90° C. or (r) a bath containing 20 per cent of sodium carbonate and 23 per cent of borax ($Na_2B_4O_7 \cdot 10 H_2O$) at 50 to 60° C. or at 70 to 90° C. or (s) a bath containing 28 per cent of sodium carbonate and 9 per cent of crystallized sodium sulphite at 50 to 60° C. or 70 to 90° C. or (t) a bath containing 20 per cent of sodium carbonate and 17 per cent of crystallized sodium sulphite at 50 to 60° C. or at 70 to 90° C. or (u) a bath containing 26 per cent of sodium carbonate and 12 per cent of sodium bicarbonate at 45 to 50° C. or (v) a bath containing 29 per cent of sodium carbonate and 8 per cent of sodium bicarbonate at 45 to 50° C. or (w) a bath containing 15 per cent of sodium carbonate and 12 per cent of sodium bicarbonate at 45 to 50° C. or (x) a bath containing 25 per cent of sodium carbonate and 3 to 5 per cent of caustic soda at 45 to 50° C. or at 60 to 70° C. or (y) a bath containing 19 to 21 per cent of sodium carbonate, 12 to 13 per cent of sodium sulphate and 3 to 5 per cent of caustic soda at 45 to 50° C. or at 60 to 70° C. or (z) sodium bicarbonate solution of 12 per cent strength at 45 to 50° C. or at 60 to 80° C.

($z^1$) a bath containing 12 per cent of sodium bicarbonate and 10 per cent of glucose at 45° C. or ($z^2$) a bath containing 12 per cent of sodium bicarbonate, 13 per cent of sodium sulphate and 10 per cent of glucose at 40 to 45° C.

The length of immersion of the thread in the coagulating bath is about 40 to 80 cm. The thread is then allowed to pass for 50 to 160 cm. through the air and is then wound on a bobbin which produces a speed of spinning of about 30 m. per minute and which bobbin may or may not revolve in water.

The threads are then washed and finished in any known manner. They may be twisted in the wet state, for instance before or during or after washing or in the dry state.

(2) The process is carried out as in (1), but except that the spinning is effected in a centrifuge spinning machine.

(3) Mode of operation as in (1) or (2), but with the variation that the spinning is conducted with additional stretch which may be effected, for example, by introducing into the path which the thread travels from the spinning nozzle to the bobbin or centrifugal box one or more brakes such as godets or differential rollers or several comb-like arranged rods or two or more glass or metal rods angular placed to each other and over which threads are conducted and are thus subjected to an additional stretching or tension. If desired, glass or metal tubes may be put over one or more of the glass or metal rods. In such case the threads do not come in contact with the rods themselves but with the tubes which must be so easily movable around the rods that they swiftly revolve when the threads are gliding over them.

The artificial threads may be treated either in the course of their manufacture or in the finished state with a hardening agent, such as formaldehyde or the like.

As a matter of course, also such film or threads as have a reduced lustre or are entirely dull can be produced from the viscose by the present process with the aid of any method known from the artificial silk art.

(4) The process is conducted as in (1) or (2) or (3), but with the exception that, instead of 30 m., the speed of spinning is 40 m. per minute.

(5) The process is conducted as in (1) or (2) or (3), but with the exception that, instead of 30 m., the speed of spinning is 60 m., per minute, the quantity of the viscose discharged per minute being about twice to three times as large as the quantity discharged in (1).

(6) The process is conducted as in any one of the working Formulae 1 to 5, but with the difference that the viscose does not directly enter the coagulating bath containing sodium carbonate, but is extruded into one of the following baths:

(a) a solution of sodium sulphate of 25 per cent strength having a temperature of 45 to 70° C. or (b) a solution of sodium chloride of 25 per cent strength having a temperature of 45 to 70° C.

(7) The process is conducted as in any one of the working Formulae 1 to 5, but with the variation that the thread is washed on the bobbin for about 15 minutes, thereupon twisted and transformed into a skein and thereafter treated for a short time (e. g. for 1 to 20 minutes) with 2 to 10 per cent sulphuric acid or 1 to 5 per cent hydrochloric acid or with a bath containing 2 to 10 per cent of sulphuric acid and 10 to 16 per cent of sodium sulphate and/or 12 to 16 per cent of magnesium sulphate at room temperature or at 40 to 50° C. or with sulphuric acid of 30 to 70 per cent strength at room temperature or at 5° C. or at 0° C. or at minus 5° C. or treated again with any one of the baths set out above in (1) under "Artificial threads" (a) to ($z^2$) and then washed and finished in the usual way. If the spinning is carried out in a centrifuge spinning machine, the first washing is performed with the cake and the separate twisting step omitted.

(8) Mode of procedure as in (7), but with the difference that, before being soured or aftertreated with one of the baths set out above in (1) under (a) to ($z^2$), the thread is washed on the bobbin or in the cake for about 2 to 3 minutes instead of 15 minutes, or not washed at all before souring.

(9) Mode or procedure as in (7) but with the difference that, before being soured or aftertreated with one of the baths set out above in (1) under (a) to ($z^2$), the thread is washed on the bobbin or in the cake for half an hour to one hour or longer (for example, for two to six hours) instead of 15 minutes.

(10) Mode of procedure as in (7) or (8) or (9), but with the exception that the first washing and the souring or after-treatment with one of the baths set out above in (1) under (a) to ($z^2$) is performed on the bobbin or cake, whereupon the thread is washed and finished.

In cake of bobbin spinning, the twisting of the thread may be effected either after the souring or after-treatment with one of the baths set out above in (1) under (a) to ($z^2$) or after the washing following the souring or after-treatment with a bath containing one or more alkali carbonates or after drying.

(11) The process is conducted according to any one of the working Formulae 1 to 6, but with the variation that the thread is twisted directly from the bobbin and thereafter converted into a skein (or, if the spinning takes place in a centrifuge machine the cake is directly transformed into a skein), whereupon the skein is washed for about 15 minutes, and thereafter treated for a short time (e. g. for 1 to 20 minutes) with one of the acid media set forth under (7) or with any one of the baths set out above in (1) under (a) to ($z^2$) and then washed and finished in the usual way.

(12) Mode of operation as in (11), but with the difference that, before being soured or after-treated with one of the baths set out above in (1) under (a) to ($z^2$), the skein is washed for about 2 to 5 minutes instead of 15 minutes.

(13) Mode of procedure as in (11), but with the exception that, before being soured or after-treated with one of the baths set out above in (1) under (a) to ($z^2$), the skein is washed for half an hour to one hour or longer (for example for 2 to 6 hours).

(14) Mode of procedure as in (11), but with the difference that, upon being brought into the form of a skein, i. e. without any intermediate washing, the thread is soured or after-treated with one of the baths set out above in (1) under (a) to ($z^2$), as described in (11) and thereafter washed and finished.

(15) Mode of operation according to any one of the working Formulae 1 to 5, but with the variation that (apart from the washing given the thread if the bobbin revolves in water or if it is washed in the funnel or pot of the centrifuge spinning machine), the thread is, without being washed, soured or after-treated direct on the bobbin or in the cake by means of any one of the acid media set forth in (7) or of any one of the baths set out above in (1) under (a) to ($z^2$) respectively, whereupon (in case of bobbin spinning, if desired, after being washed and/or twisted) optionally after having been transformed into a skein, it is washed (if it has not been washed or has been incompletely washed on the bobbin or in the cake) and finished.

(16) The process is conducted according to any one of the working Formulae 1 to 5, but with the variation that the thread collected on the bobbin or in the centrifugal box is again treated with a liquid containing an alkali carbonate, for example, with any one of the coagulating media set out in (1) under (a) to ($z^2$) for example with a 10 per cent or 25 per cent sodium carbonate solution at room temperature or at 45 to 50° C., or with a solution containing 20 per cent of sodium carbonate and 12 to 13 per cent of sodium sulphate at room temperature or at 45 to 50° C., or with a solution of a neutral salt, for example a 20 to 25 per cent solution of sodium sulphate or sodium chloride at room temperature or at 40 to 50° C. or higher. This treatment with the medium containing an alkali carbonate or with a solution of a salt can be carried out during the collection of the thread upon the bobbin or in the centrifugal box, for example by allowing the bobbin to rotate in the liquid containing a sodium carbonate and/or another salt or by introducing such liquid into the centrifugal box during spinning, and/or after the spinning by treating the thread on the bobbin or in the cake with one of the aforesaid liquids, at room temperature or at 45 to 50° C. say, for 15 to 30 minutes or longer, for example 1 to 6 hours, then (in case of bobbin spinning after twisting the thread) converting the thread into a skein, souring the skein by any one of the media set forth in (7) and washing and finishing the skein.

(17) Mode of procedure as in (16), but with the difference that, after having been after-treated with the solution containing an alkali carbonate and/or another salt and made up into a skein, the thread is, without being soured, washed and finished.

(18) Mode of procedure as in (17), but with the difference that after having been after-treated with the solution containing an alkali carbonate and/or another salt, the thread is, without being converted into a skein and without being soured, completely washed and then converted into a skein and finished.

(19) Mode of procedure as in (16), but with the difference that, after having been treated with the solution containing an alkali carbonate and/or another salt, the thread is not made up into a skein, but soured directly on the bobbin or in cake form and either washed on the bobbin or in cake form and finished or (in case of bobbin, twisted), made up into a skein, washed and finished.

(20) Mode of procedure as in (16), but with the difference that, after having been made up into a skein, the thread is washed for 2 to 3 minutes and then soured.

(21) Mode of operation as in (20), but with the exception that, before being soured, the thread is washed for about 15 minutes instead of 2 to 3 minutes.

(22) The process is conducted according to any one of the working Formulae 1 to 21, but with the variation that, before being spun into artificial threads the viscose is allowed to age at 15 to 17° C. for 36 or 48 or 60 or 72 hours.

The manufacture of staple fibre will be readily understood from the foregoing examples.

If desired, the extensibility of the artificial threads may be increased by treating them with shrinking agents, for instance, according to any one of the processes described in my U. S. Patents 1,989,098 to 1,989,101 and 2,002,621, and 2,112,499.

The desulphurization and/or bleaching of the artificial threads may be effected by any method or methods known in the viscose art, including the methods described in my U. S. Patents 2,004,875–6–7.

FILM (1) The viscose is in a known manner evenly spread on the surface of the drum of a film making machine based on the drum principle, the lower part of the drum being immersed in any one of the baths set forth under "Artificial threads" in (1) under (a) to ($z^2$) or, when the two bath system is adopted, the drum dips into any one of the baths set forth under paragraph (6) under (a) to (g), wherefrom the freshly coagulated film is introduced into one of the baths set out under "Artificial threads" in (1) under (a) to ($z^2$). The diameter of the drum and speed of rotation are so adjusted that the film is sufficiently solidified at the time of its having to quit the surface of the drum in order to undergo the contemplated after-treatment or treatments.

The solidified film is washed in a known manner with hot or warm or cold water and then dried.

The casting into film and/or drying of the film may be conducted without additional stretch or with more or less additional stretch.

The film may be treated before or after drying with an aqueous solution of glycerol (for instance of 4 to 10 per cent strength) or of glycol in order to increase its flexibility.

The film may also be treated with any one of the known moisture-proofing or water-proofing agents or compositions.

The film may be treated either in the course of its manufacture or in the finished state with a hardening agent, such as formaldehyde or the like.

(2) The process is conducted as in (1) except that, instead of being distributed on a drum, the viscose is coated, by means of a suitable appliance, upon an endless band having a smooth surface, which endless band is immersed in one of the coagulating baths set out under "Artificial threads," in (1) under (a) to ($z^2$), or, in the event of the two bath system being adopted, the endless band is immersed in any one of the baths set forth in the heading "Artificial threads" in (6) under (a) to (g), wherefrom the freshly coagulated film is introduced into one of the baths set out in the said heading in (1) under (a) to ($z^2$).

(3) The process is conducted as in (1) or (2), but with the difference that, instead of being spread on the surface of a drum or of an endless band which is at least partly immersed in the coagulating bath, the viscose is extruded through a suitable hopper or slit into any one of the baths set forth under "Artificial threads" in (1) under (a) to ($z^2$) or, in the event of the two bath system being adopted, the viscose is extruded into any one of the baths set forth under "Artificial threads" in (6) under (a) to (g), wherefrom the freshly coagulated film is introduced into one of the baths set out in (1) under (a) to ($z^2$).

(4) The process is conducted as in (1) or (2) or (3), but with the difference that, on leaving the coagulating bath or, when the two bath method is followed, the second bath, the film is further treated at room temperature or at a raised temperature in a consecutive bath containing one or more alkali carbonates in which it has been coagulated or with any other bath containing at least one alkali carbonate, for example one of the other baths set out under "Artificial threads" in (1) under (a) to ($z^2$), whereupon the thus treated film is either simply washed and finished, or washed, soured, washed again and finished.

(5) The process is conducted as in (1) or (2) or (3), but with the exception that, on leaving the coagulating bath or, when the two bath method is followed, the second bath, the film is washed for 2 to 15 minutes and thereafter treated for a short time (e. g. for 1 to 20 minutes) with a bath containing 2 to 10 per cent of $Na_2SO_4$ and 10 to 16 per cent of $Na_2SO_4$ and/or 12 to 16 per cent of $MgSO_4$ at room temperature or at 40 to 50° C. or with sulphuric acid of 30 to 70 per cent strength at room temperature or at 5° C. or at 0° C. or at minus 5° C. and then washed and finished in the usual manner.

(6) Mode of procedure as in (5), but with the difference that no intermediate washing takes place between the coagulation and the after-treatment with an acid medium.

(7) The process is conducted as in (4), but with the exception that, instead of with a bath containing one or more alkali carbonates, the film leaving the coagulating bath is, with or without intermediate washing, treated with a solution of a neutral salt, for example with a 20 to 25 per cent solution of sodium sulphate or sodium chloride at room temperature or at 40 to 50° C. or at a higher temperature.

As a matter of course, also such threads or film as have a reduced lustre or are entirely dull can be produced by the present process with the aid of any method known from the artificial silk art.

Threads or film within which hollow spaces are distributed can be obtained, for example, by incorporating with the viscose, sodium carbonate or another substance capable of developing a gas during the spinning and introducing the freshly coagulated threads or film from the coagulating bath directly into an acid bath for example one of the acid baths set forth under "Artificial threads" (section 7) or under "Film" (section 5) or by dispersing air or another gas into the viscose and coagulating the shaped cellulose ether solution by any one of the methods set forth in the heading "Artificial threads" under (1) to (22).

FINISHING (DRESSING) AND PRINTING OF TEXTILES

*Finishing*

(1) A woven fabric, such as a cotton fabric is provided by means of a suitable machine, for example a backfilling machine or a padding machine or a spreading machine, with one or more coatings of the viscose, into which a filling material such as talc or china clay or zinc white or a dye-stuff or pigment, such as a lake or lampblack or ochre or mica and/or a softening agent, for instance an oxytrimethylene-sulphide (see U. S. Patent 1,018,329) or a soap or Turkey-red oil or a drying or non-drying oil, etc. may be incorporated. The coated or impregnated or filled material is then introduced directly or after intermediate drying and/or steaming, into one of the coagulating baths or combinations of coagulating baths set forth above, in "Artificial threads" in (1) under (a) to ($z^2$) and in (6) under (a) to (g) and is then washed and dried.

The textile material may be treated before or after drying with a softening agent, such as a soap or Turkey-red oil or glycerol or the like.

(2) The procedure is as in (1), but with the exception that the viscose is mixed with a solution of starch or dextrin or any other colloid known in the finishing art.

(3) The process is conducted as in (1) or (2), but with the exception that measures are taken towards incorporating with the regenerated cellulose deposited in or on the fibres of the fabric gas bubbles or hollow spaces. This may be done in any known manner either by dispersing or otherwise distributing a gas, such as air or hydrogen or nitrogen or the like, in the viscose or by incorporating with the viscose sodium carbonate or another substance capable of liberating a gas on being contacted with an acid medium, and/or by introducing the impregnated cloth from the coagulating bath directly into an acid bath, for example sulphuric acid of 2 to 15 per cent strength at 4 to 8° C. or at room temperature or at 35 to 45° C. or into a bath containing 10 to 16 per cent of $H_2SO_4$ and 20 to 25 per cent of $Na_2SO_4$ or a bath containing 10 to 15 per cent of $Na_2SO_4$, 14 to 18 per cent of $MgSO_4$ and 6 to 16 per cent of $H_2SO_4$ at room temperature or at 35 to 45° C.

(4) The process is conducted as in any one of the Examples (1) to (3), but with the difference that before being applied to the fabric, the viscose is converted into a lather according to the process described in U. S. Patent 2,165,392.

Examples for sizing yarn follow automatically from (1) to (4).

(5) The fabric is sized with the viscose containing a dyestuff or a pigment, such as a lake or ochre or lampblack or zinc white or finely divided mica or a bronze powder free from aluminum and then printed in a rouleaux printing machine or stencilled. After being sized or printed, the cotton fabric is, if desired after being dried, introduced into one of the coagulating baths or combinations of baths set out in the heading "Artificial threads" in (1) under (a) to ($z^2$) and in (6) under (a) to (g).

What has been said in the headings "Artificial threads" and "Film," about the application to the making of threads and film, of all variations regarding the coagulating baths, their temperatures and all details of after-treatment holds good with the finishing or dressing or printing of textiles also.

Cements and adhesives

The viscose is used for the pasting together of two or more sheets of paper or cardboards or cotton fabrics or veneer, the materials pasted together being then, if desired after intermediate drying, introduced into one of the coagulating baths or combinations of baths set out in the heading "Artificial threads" in (1) under (a) to ($z^2$) and in (6) under (a) to (g).

Thick plates

Thick plates can be made by accordingly shaping concentrated solutions or pastes of the cellulose xanthate and, optionally after intermediate drying, treating them with one of the precipitating baths or combinations of baths set out in the heading "Artificial threads" in (1) under (a) to ($z^2$) and in (6) under (a) to (g).

All variations regarding the coagulating baths, their temperature, further the age of the viscose and all details of after-treatment set forth in the heading "Artificial threads" sub (1) to (22) can be applied to the practicing of the present invention for using the viscose as adhesive or for producing thick plates or the like according to the invention. As a matter of course, the manipulation and techniques must be adapted to the mechanical and other methods and ways prevailing in these arts. In the production of shaped structures or other useful articles according to the present invention, which production is illustrated by this and the following examples, the coagulating bath or baths may be kept in permanent circulation in the usual manner.

In any and all items of the example the coagulating bath or baths or other baths, may be kept in permanent circulation in the usual manner and the sodium carbonate and caustic soda may be recovered in the form of sodium carbonate or caustic soda (caustification of the sodium carbonate) as described above.

The caustic soda getting into the bath from the shaped structures may be wholly or partly converted into a sodium carbonate by continuously or temporarily introducing $CO_2$ into the bath.

Example 2

The process is conducted as in Example 1, except that the amount of carbon bisulphide used for the preparation of the cellulose xanthate is 80 parts (to 1000 parts of linters or wood pulp.

Example 3

The process is conducted as in Example 1, except that only 50 to 60 parts of carbon bisulphide are used in the preparation of the cellulose xanthate.

Example 4

The process is conducted as in Example 1, except that 150 to 200 parts of carbon bisulphide are used in the preparation of the cellulose xanthate.

In some cases the viscose of the example does not attain the fitness for yielding according to the present process shaped structures which, on leaving the coagulation bath are infinitely washable before 6 to 20 days calculated from the time of finishing the preparation of the viscose. Consequently, if it is desired to work the viscose up into shaped structures by infinitely washing the freshly coagulated shaped structures, the viscose should be aged at 15 to 30° C. and the converting of the viscose into shaped structures should be either delayed until the preliminary experiments referred to above show infinite washability, or effected according to a method which does not call for infinite washability, for example according to one of the methods set forth in the heading "Artificial threads" under (7) to (22). These or similar methods may, however, be used with good results also in cases in which the viscose has already reached the degree of fitness requisite for yielding shaped structures that leave the coagulating bath or combination of coagulating baths in an infinitely washable condition.

Example 5

The process is conducted as in any one of the Examples 1 to 4, except that, before being treated with the carbon bisulphide, the alkali cellulose is allowed to mature at 15 to 30° C. for 6 to 12 hours, or 24 or 60 or 72 or 96 or 120 or 144 hours or longer.

Example 6 (Illustrating Modification III)

A solution containing 7 to 9% of caustic soda and 6 to 8% of a cellulose ether xanthate which has been made by any one of the examples of British Patent 459,124, using not more than 10% of $CS_2$ based on the weight of the cellulose ether, is allowed to age at 15 to 18° C. for 6 to 36 hours (being filtered and degasified during that time) and is worked up into an artificial structure (being used instead of the viscose) according to any one of the treatments given in Example 1, or modifications there given.

Example 7

The process is conducted as in Example 6, but the cellulose ether xanthate solution used is a solution of a xanthate that has been prepared by reacting on the cellulose ether, in the presence of alkali, with 14 to 16 per cent of carbon bisulphide calculated on the weight of the parent cellulose ether. Such a process is covered in Lilienfeld British Patent 459,124 and in the corresponding U. S. application 71,263.

In some cases solutions of cellulose ether xanthates, after being made with 14 to 16 per cent of $CS_2$ have to be aged for 3 to 16 days at 15 to 30° C., before they attain the fitness for yielding according to the present process, shaped structures which, on leaving the coagulating bath are infinitely washable. Hence, trials can be made to show the infinite washability, or the solution, without aging so long, can be worked up by a method which does not call for infinite workability, for example according to one of the methods of making artificial threads set forth in Example 1, under (7) to (21). These or similar methods may, however, be used with good results also in cases in which the cellulose ether xanthate solution has already reached the degree of fitness requisite for yielding shaped structures that leave the coagulating bath or combination of coagulating baths in an infinitely washable condition.

EXAMPLE 8

The process is conducted as in Example 6, but the cellulose ether xanthate is made by reacting upon any alkyl ether of cellulose which does not dissolve in the usual organic solvents (alcohol, acetone, benzol, ether or chloroform, or mixtures of these) at any temperature, does not dissolve in water at any temperature, does not dissolve in aqueous caustic soda solution of 4 to 9% concentration at room temperature, but which does dissolve in this latter by refrigeration to close to the freezing point thereof. Such alkyl ether can be made in any suitable manner, and is treated in the customary manner with caustic alkali solution (e. g. with 2.5 times its weight of an aqueous 18% NaOH solution), and then is treated with about 10% of carbon bisulphide (based on the weight of the ether), and agitated in a drum, with said carbon bisulphide, for 1 to 2 hours at room temperature.

Methods of producing such ethers are disclosed in British Patents 459,122, 459,123, 459,124, 462,383, 462,456, 462,712 and 462,713.

EXAMPLE 9

The process is conducted as in Example 6, except that the proportion of carbon disulphide exceeds 10 per cent, but is smaller than 20 per cent calculated on the cellulose ether.

EXAMPLE 10

The process is conducted as in any one of Examples 6 to 9, but a solution of a cellulose ether xanthate made with less than 20% of $CS_2$, and preferably below 15% of $CS_2$ or even below 10% of $CS_2$, based on the cellulose ether, with an alkali-soluble cellulose ether (see U. S. Patent 1,682,292, British Patents 231,808, 231,811, and 374,964, and U. S. application 23,590 and Examples I or VI to XIX of U. S. Serial No. 79,198).

For producing such mixed solution, the cellulose ether xanthate in the dissolved or semi-dissolved or undissolved state is brought together with the said alkali-soluble cellulose ether, also in the dissolved or semi-dissolved or preferably the undissolved state, caustic alkali solution being the final solvent of the said mixture.

EXAMPLE 11 (ILLUSTRATING MODIFICATION II)

1,000 parts of air-dry cotton linters or wood pulp are steeped in 10,000 to 20,000 parts of caustic soda solution of 18 per cent strength at 15 to 20° C. and the mixture allowed to stand at 15 to 20° C. for 1 to 24 hours. The resulting mass is then pressed to 3,000 to 3,500 parts and comminuted at 10 to 20° C. for 2 to 3 hours in a Werner-Pfleiderer shredder or any other suitable comminuting machine or in a Werner-Pfleiderer xanthating machine whose blades may be den- tated. Then the thus obtained alkali cellulose is allowed to mature at 21° C. for 48 hours, whereupon it is treated in a xanthating machine with 250 to 300 parts of carbon bisulphide, the time of treatment being according to the intensity of stirring, kneading and agitation given the reaction mass, 1 to 12 hours.

The thus obtained cellulose xanthate is now dissolved in so much caustic soda and water as to yield a viscose containing 8% of regenerable cellulose and 6 to 9% of caustic soda. The dissolving may be conducted at room temperature or at a temperature between room temperature and 0° C. or at 0° C. or, according to the process described in my U. S. Patent 1,658,607, at a temperature below 0° C. for example at minus 5 or minus 10° C. or lower.

In some cases the viscose of this example does not attain the fitness for yielding, according to the present process, shaped structures which, on leaving the coagulating bath are infinitely washable, before 10 to 21 days calculated from the time of the preparation of the viscose being completed. Consequently, if it is desired to work the viscose up into shaped structures by infinitely washing the freshly coagulated shaped structures, the viscose should be aged at 15 to 30° C. or warmed to 60° C. and its conversion into shaped structures should be either delayed until the preliminary tests referred to above show infinite washability, or effected according to a method which does not call for infinite washability, for example according to one of the methods set forth in Example 1, the heading "Artificial threads" under (7) to (22). These or similar methods may also be used with good results in cases in which the viscose has already reached the degree of fitness requisite for yielding shaped structures that leave the coagulating bath or combination of coagulating baths in an infinitely washable condition.

The so aged viscose is worked up into artificial structures as set forth in Example 1, with the baths and conditions there stated.

EXAMPLE 12

The process is conducted as in Example 11, except that the proportion of carbon bisulphide used for the preparation of the cellulose xanthate is 400 to 500 parts.

In some cases the viscose of this example, for yielding according to the present process shaped structures which on leaving the coagulating bath are infinitely washable, may require to be aged for 14 to 36 days at 15° C. or a correspondingly shorter time at a higher temperature, e. g. 30° C. or 60° C.

EXAMPLE 13

The process is conducted as in Examples 11 or 12, except that, before being treated with the carbon bisulphide, the alkali cellulose is allowed to mature at 15 to 30° C. for 6 to 12 or 24 or 60 or 72 or 96 or 120 or 144 hours or longer, or is not allowed to mature.

EXAMPLE 14

The process is conducted as in Example 11, but instead of the viscose alone, a mixed solution (in dilute caustic alkali solution) containing cellulose xanthate and one or more alkali-soluble cellulose ethers is used, which product does not contain more than 20%, preferably however less than 15% or even less than 10% of $CS_2$. (See, for example, British patents Nos. 231,808, 231,811, 374,964, 469,007 (for instance, the products of Example I or VI to XIX) and 470,747.)

Example 15 (Illustrating Modification IV)

A solution containing 7 to 9 per cent of caustic soda and 6 to 8 per cent of a cellulose ether xanthate is prepared by means of 25 to 30 per cent of carbon bisulphide (calculated on the weight of the cellulose ether) according to any one of the processes described in Brititsh Patents Nos. 335,994, 357,167, 357,595, 367,920, 368,288, 390,519, 459,122, 459,123, 459,124, 462,283, 462,456, 462,712 or 462,713.

Usually the cellulose ether xanthate solution of the example does not attain the fitness for yielding according to the present process shaped structures which, on leaving the coagulating bath are infinely washable unless aged (e. g. at 15–18° C.), 10 to 21 days calculated from the time of the preparation of the cellulose ether xanthate solution being completed, or unless aged for a shorter time at a correspondingly high temperature. Consequently, if it is desired to work the cellulose ether xanthate solution up into shaped structures by infinitely washing the freshly coagulated shaped structures, the cellulose ether xanthate solution should be aged to the extent indicated, and then worked up according to the process of Example 1. Or the coagulation can be effected according to a method which does not call for infinite washability directly after coagulation, for example according to one of the methods set forth in Example 1, in the heading "Artificial threads" under paragraphs (7) to (21). These or similar methods may however be used with good results also in cases in which the cellulose ether xanthate solution has been aged as above stated.

Example 16

The process is conducted as in Example 15, except that the proportion of carbon bisulphide used for the preparation of the cellulose ether xanthate is 40 to 50%, based on the cellulose ether.

Here, usually the cellulose ether xanthate solution does not attain the fitness for yielding according to the present process shaped structures which on leaving the coagulating bath are infinitely washable before being aged (e. g. at 15° C.), for 14 to 36 days calculated from the time of finishing the preparation of the cellulose ether xanthate solution.

Example 17

The process is conducted as in Example 15, but with the difference that, instead of the cellulose ether xanthate solution, a solution of a product of bringing together cellulose xanthate with one or more alkali-soluble cellulose ethers is used, which product does not contain less than 20% of $CS_2$, based on the cellulose ether. (See, for example, U. S. Patents Nos. 1,722,928, 1,682,292 and British Patent 374,964 and U. S. applications 73,590 and 79,198.)

In a modified form of execution of the process, the spinning solution can contain a xanthate of a cellulose ether, of the type set forth above, dissolved in caustic alkali solution as described above, and also an alkali soluble cellulose ether dissolved in solution therein. In this modification also, the amount of $CS_2$ is above 20%, based on the sum of the cellulose ether in the xanthate and the said dissolved alkali soluble cellulose ether.

For producing such mixed solution, the cellulose ether xanthate in a dissolved or semi-dissolved or preferably undissolved state is brought together with the said alkali soluble cellulose ether, also in a dissolved or semi-dissolved or undissolved state, caustic alkali solution being the final solvent of the said mixture.

The employment of small amounts of carbon bisulphide in making cellulose ether xanthates, as described herein is claimed in a copending application Serial No. 71,263, filed March 27, 1936 (now allowed).

Alkyl ethers of cellulose of low alkyl content, as described herein, and the manufacture of the same, as disclosed herein, are claimed in a copending application 314,359, filed January 17, 1940.

What is claimed is:

1. A process of producing an artificial shaped structure which comprises the step of bringing a shaped body of a solution of a xanthate of a cellulosic body in aqueous caustic alkali solution, into contact with a coagulating liquid which is an aqueous solution of an alkali metal salt of carbonic acid, said coagulating liquid being free from substances capable of neutralizing caustic alkali.

2. A process of making a shaped cellulosic structure which comprises bringing a shaped body of a solution of a xanthate of a cellulosic body in aqueous caustic alkali solution, into a coagulating bath which is an aqueous solution of an alkali metal salt of carbonic acid, and which solution is sufficiently concentrated in salt to act as a coagulating agent for said xanthate, and which solution is free from salts of strong acids with weak bases.

3. In the art of coagulating shaped regenerated cellulosic structures by introducing a shaped solution in dilute aqueous caustic alkali solution of a xanthate of a cellulosic body into a coagulating bath, the herein described improvement which comprises so introducing the shaped solution into a coagulating bath which is an aqueous solution of an alkali metal carbonate and which is free from strong acid salts of weak bases, which if present would neutralize the caustic alkali, the alkali metal carbonate in said solution being sufficiently concentrated to act as a coagulating agent for the cellulosic body.

4. A process as claimed in claim 1, wherein besides at least one alkali carbonate the coagulating bath contains a salt of an alkali metal, which does not neutralize the alkali carbonate.

5. A process as claimed in claim 1, which comprises contacting the shaped structure obtained by coagulation with a bath containing at least one alkali carbonate, with an acid bath.

6. A process as claimed in claim 1, which comprises the step of applying the solution of the cellulose xanthate to be coagulated, upon a textile material.

7. A process of making an artificial shaped structure, which comprises introducing a shaped solution of a cellulose xanthate in a caustic alkali solution, in the making of which xanthate there has been used at least 20% of $CS_2$, based on the weight of the cellulose employed, into contact with an aqueous solution containing as its characteristic component, a dissolved alkali carbonate, which aqueous solution is free from other substances capable of reacting upon a caustic alkali to convert the same into a salt having a neutral reaction.

8. A process of making an artificial shaped structure which comprises introducing into contact with a succession of aqueous liquids, a solution in caustic alkali solution of a xanthate of a cellulosic body, which xanthate solution has been given the shape of an artificial structure desired, at least the first one of the said aqueous liquids being a solution of an alkali metal carbonate which is free from other substances which would be capable of acting upon caustic alkali to produce a neutral salt, and at least one other of said aqueous liquids, subsequent to a first solution of alkali metal carbonate, being an acid solution which itself is capable of coagulating artificial shaped structures from viscose.

9. A process as claimed in claim 1, wherein the shaped structure obtained by coagulation with a bath containing at least one alkali carbonate is thereafter treated in coagulated form with a bath containing at least one alkali carbonate.

10. A process as in claim 1, in which the xanthate of a cellulosic body is a cellulose xanthate containing the reaction products of less than 20% of $CS_2$ based on the amount of cellulose.

11. A process as in claim 1, in which the xanthate of a cellulosic body is a cellulose xanthate containing the reaction products of not less than 20% of $CS_2$ based on the amount of cellulose.

12. A process as in claim 1, in which the xanthate of a cellulosic body is a xanthate of a cellulose ether which contains the reaction products of less than 20% of $CS_2$ based on the amount of said cellulose ether.

13. A process as in claim 1, in which the xanthate of a cellulosic body is a xanthate of a cellulose ether which contains the reaction products of not less than 20% of $CS_2$ based on the amount of said cellulose ether.

14. A process of making useful shaped structures from a solution of a xanthate of a cellulose ether in dilute aqueous caustic alkali solution, which comprises giving the solution the shape of the artificial structure desired, and coagulating said shaped solution by an aqueous solution of an alkali carbonate, which solution is free from salts of strong acids with weak bases.

15. A process of making useful shaped structures from a solution of a xanthate of a cellulose ether in dilute aqueous caustic alkali solution, which comprises giving the solution the shape of the artificial structure desired, coagulating said shaped solution by an aqueous solution of an alkali carbonate, which solution is free from other substances capable of neutralizing caustic alkali.

16. A process of making a shaped structure from a shaped solution of a cellulose ether xanthate, in the preparation of which xanthate there was added at least about 20% of carbon bisulphide based on the weight of the original cellulose ether, such xanthate being dissolved in a caustic alkali solution, which process comprises introducing such shaped solution into contact with a medium which is an aqueous solution of an alkali metal carbonate as the essential coagulating agent, the concentration of the carbonate in such solution being sufficient to coagulate the cellulosic body in a shaped condition, and such carbonate solution being substantially free from substance capable of neutralizing caustic alkali.

17. A process as in claim 1, in which the solution of a xanthate of a cellulosic body contains also in solution, a dissolved water-insoluble cellulose ether.

ANTONIE LILIENFELD,
*Special Administratrix of the Estate of Leon Lilienfeld, Deceased.*